United States Patent
Lopota et al.

(10) Patent No.: US 8,462,211 B2
(45) Date of Patent: Jun. 11, 2013

(54) METHOD OF DETECTING OBJECTS

(75) Inventors: Vitaly Alexandrovich Lopota, Ulitsa Politekhnicheskaya (RU); Alexander Sergeyevich Kondratyev, Ulitsa Zheni Yegorovoy (RU); Victor Ivanovich Yudin, Prospekt Engelsa (RU); Sergey Anatoliyevich Polovko, Ulitsa Torzhkovskaya (RU); Ekaterina Yurevna Smirnova, Ulitsa Gavrskaya (RU); Kirill Nikolayevich Stupin, Prospekt Shvernika (RU); Lev Borisovich Kogan, Prospekt Kultury (RU); Dmitry Nikolayevich Stepanov, Ulitsa Kosmonavtov (RU)

(73) Assignee: Hitachi Kokusai Electric Inc., Tokyo (JP)

( * ) Notice: Subject to any disclaimer, the term of this patent is extended or adjusted under 35 U.S.C. 154(b) by 887 days.

(21) Appl. No.: 12/407,606

(22) Filed: Mar. 19, 2009
(Under 37 CFR 1.47)

(65) Prior Publication Data
US 2009/0284660 A1 Nov. 19, 2009

(30) Foreign Application Priority Data

May 19, 2008 (RU) ................................ 2008119711

(51) Int. Cl.
*H04N 7/18* (2006.01)
(52) U.S. Cl.
USPC ........... 348/149; 348/169; 382/103; 382/173; 382/181; 382/195
(58) Field of Classification Search
USPC ....................................................... 348/149
See application file for complete search history.

(56) References Cited

U.S. PATENT DOCUMENTS

| | | | |
|---|---|---|---|
| 2002/0051058 A1* | 5/2002 | Ito et al. ......................... | 348/152 |
| 2004/0239762 A1* | 12/2004 | Porikli et al. .................. | 348/169 |
| 2007/0133880 A1* | 6/2007 | Sun et al. ....................... | 382/195 |
| 2007/0160289 A1* | 7/2007 | Lipton et al. .................. | 382/173 |
| 2007/0195993 A1* | 8/2007 | Chen et al. .................... | 382/103 |
| 2008/0226172 A1* | 9/2008 | Connell ........................ | 382/181 |

FOREIGN PATENT DOCUMENTS

RU 2262661 C2 10/2005

OTHER PUBLICATIONS

S.S. Cheung, C. Kamath, Robust techniques for background subtraction in Urban traffic video, in: Video Communications and Image Processing. SPIE Electronic Imaging, vol. 5308, San Jose, California, Jan. 2004.*

(Continued)

*Primary Examiner* — Carl Colin
*Assistant Examiner* — S. Ali Zaidi
(74) *Attorney, Agent, or Firm* — Brundidge & Stanger, P.C.

(57) ABSTRACT

The invention, at the first frame, records the background, as the threshold of detection-constant image with the predetermining minimum threshold, and with each subsequent frame, corrects the background and threshold with formulas while producing the adaptation of a renewal-constant in each pixel depending on the presence of the detected object, defines the difference between the current frame and background, compares it with the threshold, combines elements exceeding a threshold into detection zones, performs rejection of the detection zones, divides the zones in order to separate shadows, forms a tracking zone, searches already-detected segment of objects, forming clusters of the tracking zones. The coordinates of the obtained rectangles are assumed as the coordinates of the objects located in the frame.

10 Claims, 2 Drawing Sheets

OTHER PUBLICATIONS

Mittal, A.; Huttenlocher, D.;, "Scene modeling for wide area surveillance and image synthesis," Computer Vision and Pattern Recognition, 2000. Proceedings. IEEE Conference on, vol. 2, no., pp. 160-167 vol. 2, 2000.*

Mohamed Dahmane, Jean Meunier. Real-time moving object detection and shadow removing in video surveillance[J]. 3rd International Conference: IEEE of Sciences of Electronic, Technologies of Information and Telecommunications Mar. 27-31, 2005.*

Tzung-Min Su; Jwu-Sheng Hu;, "Background removal in vision servo system using Gaussian Mixture Model framework," Networking, Sensing and Control, 2004 IEEE International Conference on, vol. 1, no., pp. 70-75 vol. 1, Mar. 21-23, 2004.*

"An Algorithm to Estimate Vehicle Speed Using Un-Calibrated Cameras" by Dailey, et al., University of Washington, 1999.

A. Stergiou, et al "The AIT Outdoor Tracker for Vehicles and Pedestrian in CLEAR2007", Multimodal Technologies for Perception of Humans, Springer Berlin Heidelberg, Berlin, Heidelberg, vol. 4625, May 8, 2007, pp. 148-159.

M. Harville, et al "Adaptive Video Background Modeling Using Color and Depth", Proceedings 2001 International Conference on Image Processing, Oct. 7-10, 2001, vol. 3, pp. 90-93.

B. U. Toreyin, "Moving Object Detection in Wavelet Compressed Video", Signal Processing, Image Communication, Elsevier Science Publishers, vol. 20, No. 3, Mar. 1, 2005, pp. 255-264.

L. Shapiro, et al., "Computer Vision" Moscow: BINOM, Knowledge Lab, 2006, pp. 69-75, 186-192, 213-221, 227-278, 479-492.

S. Achelis, "Technical Analysis from A to Z", p. 184-192, 1995.

* cited by examiner

METHOD OF DETECTING OBJECTS

INCORPORATION BY REFERENCE

The present application claims priority from Russian application 2008119711 filed on May 19, 2008, the content of which is hereby incorporated by reference into this application.

BACKGROUND OF THE INVENTION

1. Field of the Invention

The invention relates to the field of optoelectronic systems, and information processing, and is suitable to be used in the composition of security systems and traffic analysis in complex interference caused by regular and temporary changes in lighting, motion of foliage and water, collapse by rain, snow, etc.

2. Description of the Related Art

There is a way to detect moving vehicles (see, e.g., *An Algorithm to Estimate Vehicle Speed Using Un-Calibrated Cameras* by Dailey, D. J., et al., hereinafter referred to as Dailey) including obtaining frames, computation of the difference between frames, binarization with the threshold, morphological operations, and calculation of the Sobel operator for determining the boundaries of an object.

The disadvantages of this method include low tolerance of noises. Consequently, low accuracy of detection as a result of the conspicuous influence of the changes in the region of a working scene, due to the time of day, weather conditions, and appearance of new stationary objects in the zone of monitoring.

In the conventional art, a method of detecting moving vehicles is provided (see, e.g., Russian Patent No. 2262661 to Eremin, et al., hereinafter referred to as Eremin). It includes obtaining frames, computation of the difference between frames, binarization with the threshold, morphological operations, calculation of the Sobel operator, storing the first frame, correction of background according to the specific formula, the definition of the difference between the frame and background, obtaining the histogram of the image, finding a maximum of brightness, verifying the presence of objects, separating the intermingling objects, forming rectangles which represent the position of vehicles and their coordinates assumed as the vehicles locate in the frame means.

The disadvantages of this method include: the false detection of shadows as the objects—vehicles, the inability to determine the real size of detected objects. Another disadvantage of this method is that in the case of false detection of the objects or the location of objects which were brought and left behind in the scene, renovation of the background model in appropriate pixels ceases completely, leading to the impossibility of automatic consolidation of new static objects into background. Thus, this method results in an insufficient quality in the determination of vehicles.

SUMMARY OF THE INVENTION

It is an object of some aspects of the present invention to expand the functionality and improve the quality of television monitoring security systems under the complex climatic conditions and with a dynamic background by reducing the number of false responses and improving the accuracy of determining the boundaries of moving objects.

Accordingly, we propose a method of detecting objects. In a aspect of the invention, a technique includes the following steps/operations:

1) Obtaining a frame.
2) establishing the background and its subsequent correction, which is achieved with the aid of some constants of the renovation of background $\rho$, which in turn are chosen in each pixel depending on the detection of the object by the rule:

$$\rho = \begin{cases} \rho_1, & \text{if pixel classified as a background} \\ k*\rho_1, & \text{if pixel classified as an object} \end{cases} \quad (1)$$

where $0<\rho_1<1$, k–factor, $0<=k<=1$.

3) Calculating an absolute difference between the current frame and the background.
4) Binarization with threshold frame, the threshold values of pixels are calculated by the formula $p_i=k_1^2\sigma_i^2$, where $k_1$—coefficient, $\sigma_i$—calculated by the formula of moving average $\sigma_i^2=(1-\rho)\sigma_{i-1}^2+\rho(\mu_i-I_{i-1})^2$, where $I_{i-}$—the previous frame, $\mu_i$—current background image. During the binarization the rule is used:

$$r = \begin{cases} 255, & \text{if } (I_i - \mu_i)^2 > p_i \\ 0, & \text{otherwise} \end{cases} \quad (2)$$

where $I_i$—the current frame.

5) Performing spatial filtering through the creation of the zones of pre-detection in the binarized frame.
6) Eliminating the pre-detection zones which describe (identify) the position of objects, and dividing off the remains of elimination into the sections.
7) Forming tracking zones which are independent parts of objects.
8) Eliminating some tracking zones and uniting the remaining zones into clusters. After that, processing the elimination of clusters. The elimination of zones and clusters is performed by taking into account their metric sizes and coordinates. The coordinates of the remaining clusters assume as the coordinates of the objects.

The renovation (update) of the background frame with a small constant of renewal whose value is chosen by the rule (1) enables the automatic inclusion of objects which are located in the detection zone for a long time in a steady state, into the background frame. Implementation of spatial filtering in a special manner with the multilevel elimination of the corresponding zones and clusters according to their occupancy, metric sizes and coordinates enables to reduce the number of false responses, cut off the shadows whose objects throw in the detection zone, thereby improving the quality and accuracy of the method. Determination of the metric sizes of objects enables to analyze trajectories of motion of the objects, that extends the functionality of the system—implementation of the method. Thus distinctive features are essential and necessary for the solution of the problem presented.

The other objects and methods of achieving the objects will be readily understood in conjunction with the description of embodiments of the present invention and the drawings.

DETAILED DESCRIPTION OF EMBODIMENTS

An apparatus implemented in an embodiment of the invention contains at least one video camera, a terminal of surveillance adapted to inform the operator and to obtain a control command from the operator, and at least one computer having a memory, connected by coaxial cable or local area network.

To implement the method of the embodiment, for example, the sequence of frames from a stationary television, as color or black and white can be used. The computer forms an array of items for each frame in memory. Every pixel of image is stored in an array of brightness value, for example, separately for red, green and blue channels (RGB-submission), or separately through YUV, either on a single channel brightness (L. Shapiro 2006 (L. Shapiro, G. Stockman. Computer vision. Moscow: BINOM. Knowledge Lab, 2006), 249-259).

Before starting the work, it is necessary to set initial parameters in the device, realized, for example, using operator workplace:

parameters of the camera calibration (the focal length, sight angle, angle around the axis, the height of installing cameras, the size of the sensor, the sensor permission—these parameters can be known from direct measurements, camera specification data, either automatically determined using the known methods of calibration (L. Shapiro 2006, 567-578);

width w and height h sections and zones escorts, minimum and maximum width ($W_{CMin}$, $W_{CMax}$) and height ($H_{CMin}$, $H_{CMax}$) facility, set the coordinates of ignoring areas—parts of images in which found objects will be discarded;

updating constant $\rho_I$, coefficient of changes of renewal constant k, the threshold factor $k_1$;

coefficient of similarity with the background $C_{Bkg}$, coefficient of overlapping sections and tracking zones, the proximity factor with the background, and a degree of similarity for searching of tracking zones from previous frames $C_{TrCorr}$;

the number of frames, during which time tracking zone will remain until it is not found in the current frame, the distance between the tracking zones for the formation of clusters (for example, in pixels), the threshold life time of cluster LT.

width and height of tracking zone $W_{Merge}$, $H_{Merge}$;

percent of overlapping to assign sections to tracking zone $C_{Ovr}$ and percentage of area ratio for eliminating of tracking zones $C_{ARatio}$.

Then the device gets the first frame and conducts initialization of a background frame, for example, with zero values, or for reducing the time to start the operating mode, with the first frame. The device also produces initialization of a threshold frame with a constant value, for example, 255, if each pixel threshold frame corresponds to 1 byte.

Then the device gets the next frame for each new frame complete:

1) updating constant of the background is determined for each pixel, depending on the presence of the detected objects on the rule (1). A renewal constant is chosen, for example, as $\rho_1 = 0001$, and factor k=0,1. The renewal constant is chosen so that objects to be detected, should not merge with the background frame, but background fluctuations (grass, water, etc.) and slowly moving shadows should be filtered. The coefficient is chosen corresponding to the desired time of detection of stopped objects $\tau$, for example k~5/($\rho_1 \tau$).

2) produce updating of the background frame and of the standard deviation by the formula of exponential moving average (S. Achelis, Technical Analysis from A to Z, p. 184-192, 1995):

$$\mu_i = (1-\rho)\mu_{i-1} + \rho I_{i-1} \qquad (3)$$

$$\sigma_i^2 = (1-\rho)\sigma_{i-1}^2 + \rho(\mu_i - I_{i-1})^2 \qquad (4)$$

where $I_i$—the current frame, $I_{i-1}$—previous frame, $\mu_i$—the current background frame, $\mu_{i-1}$—previous background frame, $\sigma_i^2$—current value of the mean deviation, $\sigma_{i-1}^2$—previous value of the mean deviation, i—the number of current frame.

3) calculate the absolute difference between the current scenes and background scenes in each pixel (L. Shapiro 2006, 329-331), that is shaping frame difference D:

$$D_i = |I_i - \mu_i| \qquad (5)$$

4) form the threshold frame by the formula:

$$p_i = k_1 \sigma_i, \qquad (6)$$

where $k_1 = 3 \ldots 5$—a constant factor. Greater value is chosen for scenes with more intense noise, or less—for static scenes.

5) produce binarization—comparison of with the threshold frame and difference frame by rule (2) with the formation of a binary frame r;

6) when using color pictures, color channels unite into one. For example, in the case of pixel values in the form of red, green and blue colors (RGB—presentation (L. Shapiro 2006, 249-252)), an association produced by the rule:

$$m = r^R \text{ OR } r^G \text{ OR } r^B, \qquad (7)$$

where m—the resulting value, $r^R$, $r^G$ and $r^B$—the values in, respectively, blue, green and red channels, "OR"—boolean "OR" function, such that if the value of any of the arguments is different from zero, the result is equal to 1 otherwise 0.

Figure 1:
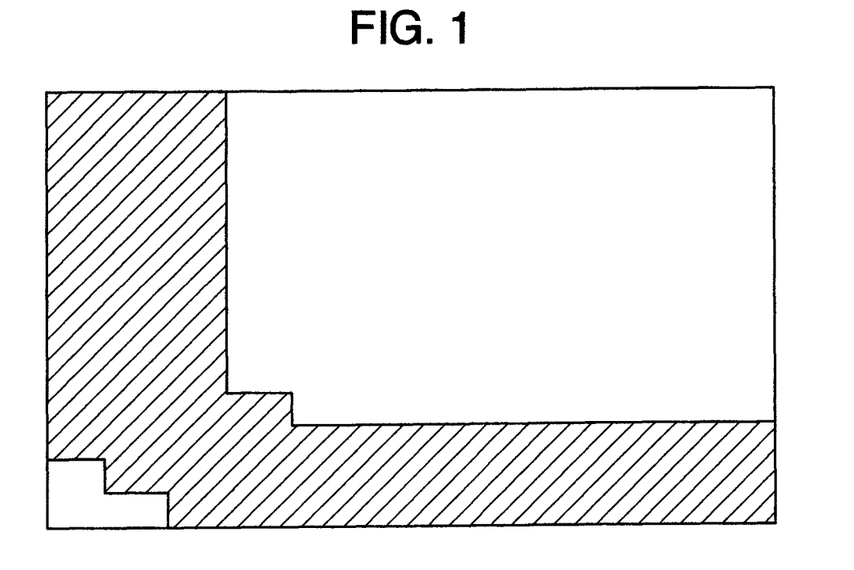
FIG. 1 shows rectangles indicating the zones of pre-detection.

Spatial filtering is performed as follows:

7) mark all connected areas of nonzero value in the binary frame using any known way (L. Shapiro 2006, 84-92) and create from these areas the zones of prior detection as circumscribing the rectangles, which bounding coordinates are the coordinates for the zones. Rectangles are built in a well-known way, choosing the extreme right, top, bottom and left point of each area and holding through them, respectively, right, top, bottom and left side of the rectangle (FIG. 1);

8) calculate metric sizes of prior detection zones using, for example, calibrated cameras, and produce elimination (culling) with width $w_{min}$, $w_{max}$, altitude $h_{min}$, $h_{max}$ of clusters.

Figure 2:
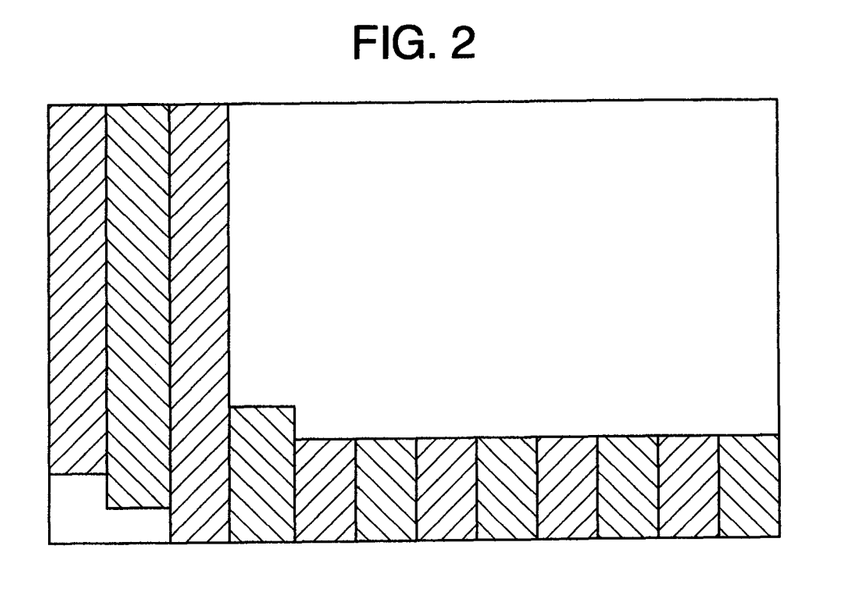
FIG. 2 shows the dividing the zones of pre-detection into sections of equal width.

9) each zone of prior detection in binary frame is divided into sections of equal width (FIG. 2). Width w is defined at the setting stage, based on the alleged size of the detected objects, for example, for a person or a car, the width w=0.2 m can be chosen. The width of a section is clarified in pixel units so that the zone could be divided into an integer number of sections. They calculate this integer number of sections of the width of w, which could be deployed inside the zone, and then divide the width of the zone at this number, receiving the required width of the section.

Figure 3:
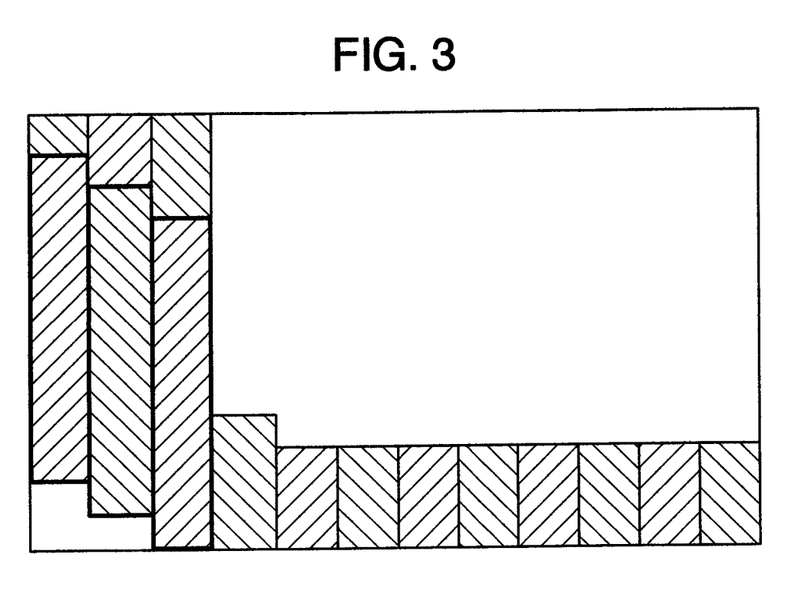
FIG. 3 shows the creating a new tracking zone from the sections.
Figure 4:
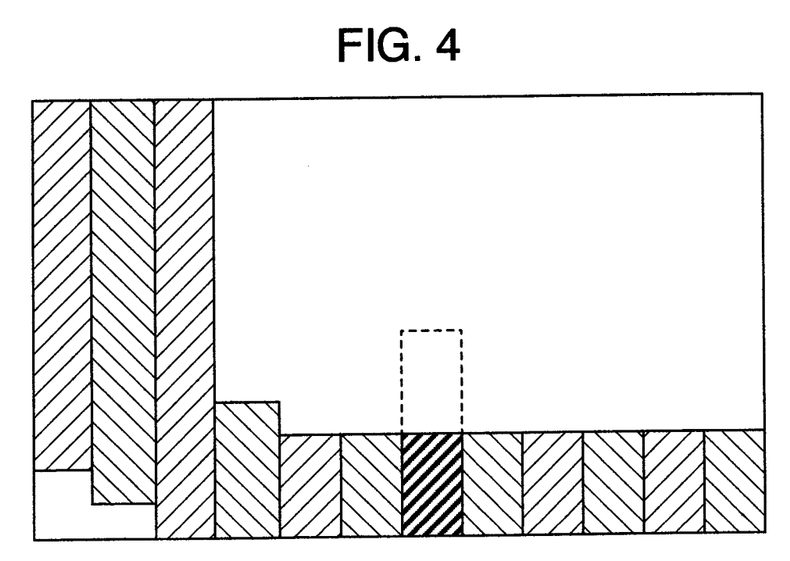
FIG. 4 shows the assigning a section to the tracking zone.

10) New tracking zones are created (FIG. 3). For this at first for the section which is situated closest to the central point of the bottom frame, a tracking zone of predefined metric height h and metric width w is created (for example, h=0.8 m—for a man so that he will be discovered, even if half of the man is hidden by bushes, merged with the background, or not detected for other reasons). Then, for each section, the area of overlapping with the tracking zone (FIG. 4) is calculated. If the ratio of this square to the square of the section exceeds the specified threshold, for example, 60%, the section is assigned to a tracking zone, and the procedure is repeated until there are no remaining unprocessed sections.

11) For each tracking zone, the total area of sections assigned to the tracking zone and the total area of overlapping are calculated. Tracking zones, in which the ratio of the total area of overlapping to the total area of sections exceeds the specified threshold, for example, 50%, are believed reliable, and all sections assigned thereto are excluded from further processing, otherwise tracking zone is rejected.

12) Perform comparison of tracking zones with the background frame, for instance, by calculating the correlation function, the zones for which the value of the function exceeds the specified threshold correlation (60%), are sorted out, and execute searching (for example, the correlation) of the tracking zones formed at the previous frames in the current frame. Zones in which the value of a collation function (correlation) exceeds the specified threshold, for example, 70% (i.e. matched) during any displacement, are added to the list of new tracking zones. A zone, for which there is no correspondence more than e.g. $N_{miss}=5$ in successive frames, is rejected (L. Shapiro 2006, 219-225);

13) unite the new tracking zones which are closely located into clusters. For example, tracking zones, the distance between the boundaries of which is less than a given amount, for example, 5 pixels or 10 centimeters;

14) calculate metric sizes of clusters using, for example, calibrated cameras, and produce rejecting accounting width $W_{CMin}$, $W_{CMax}$, and altitude $H_{CMin}$, $H_{CMax}$ of clusters, and due to their position relative to defined ignoring zones (L. Shapiro 2006, 578-580). For example, if the lower mid-point of the cluster ("legs") gets inside the defined zone of ignoring, such a cluster should be rejected;

15) the lifetime of the cluster is defined as the number of frames, during which cluster reveals itself. For this purpose, produce a comparison of the remaining clusters with clusters saved in previous frames. For clusters, in which the pair having close coordinates and size were found, write down the value of the frame counter, increasing by one while a cluster is found in old clusters. Clusters, a frame counter of which is less than a specified threshold, for example, 40, are retained, but they are excluded from further processing at the current frame. The threshold is chosen experimentally, in a way to prevent short-lived objects from false detection. For clusters that are not match with a pair from previous frame, establish the value of life-time=1, which gives the initial value for subsequent frames.

16) coordinates of clusters, which successfully passes rejecting, accepted as the coordinates of objects in the frame.

An embodiment is described below.

One takes a sequence of black-and-white television frames from video surveillance cameras and gives them one after another at the entrance device that implements a method. Using calibration methods, determine the following calibration parameters by one of the frames and camera nameplate parameters: the sine and cosine of camera tilting angle $\sin(\alpha)=0.997564$, $\cos(\alpha)=0.069756$, mounting height of the camera H=4 m, cosine and sine of camera turning angle $\sin(\beta)=0$, $\cos(\beta)=1$, metric size pixel $W_{px}=0.0003$, $H_{px}=0.0003$, the camera focal length f=0.24, the height of the horizon lines on the frame $H_{hor}=55$.

Define the constant of updating $\rho_1=0005$, the rate k=0.2, and the rate of $k_1=3$. Define restrictions on the size of the prior detection zones in meters: $w_{min}=0.1$, $w_{max}=2$, $h_{min}=0.1$, $h_{max}=3$.

Define a threshold of similarity with the background $C_{Bkg}=70\%$, the rate of expansion of the tracking zone while creating the search zone in width $C_{TrWExp}=1$ and high $C_{TrHExp}=1$, i.e. determine that the search will take place in the area obtained by the expansion of the tracking zone as halfwidth toward right and left respectively, likewise in the height direction.

Define the degree of similarity for search of tracking zones from previous frames $C_{TrCorr}=60\%$.

Define fill rate of tracking zones $C_{TrFill}=30\%$.

Define rate of zones overlap $C_{ZOver}=95\%$.

Define a number of frames, during which time zone will maintain support, if it is not found in the current frame, $N_{mf}=1$.

Define the distance between the tracking zones for the formation of clusters CF=5 pixels.

Define the cluster lifetime threshold LT=40 frames.

Define permissible cluster width and height $W_{CMin}=0$, $W_{CMin}=2$ m, $H_{CMin}=0$, $H_{CMax}=4$ m.

Define width and height of tracking zone $W_{Merge}=0.2$ m, $H_{Merge}=0.8$ m.

Define the percentage of overlapping to assign a section to the tracking zones $C_{Over}=10\%$ and the percentage of space for rejection of tracking zones $C_{ARatio}=50\%$.

Take a first frame with values $I_1^{0,0,R}=4$, $I_1^{0,0,G}=0$, $I_1^{0,2,B}=0$, ..., $I_1^{319,239,R}=176$ and use it to initialize the background frame $B_1=I_1$. Here and further the upper indices match pixel coordinates in a frame; first index—column, second—a row, third—R, G or B—color channel.

Set pixel values of a threshold frame equal to 255 in each color channel: $p_1^{0,0,R}=255$, $p_1^{0,1,R}=255$, $p_1^{0,2,B}=255$, ..., $p_1^{319,239,B}=255$.

take a second frame with values $I_2^{0,0,R}=6$, $I_2^{0,0,G}=0$, $I_2^{0,2,B}=6$, ..., $I_2^{319,239,B}=178$. Execute updating of background and threshold frames with formulas (3, 4, 6). Obtain $B_2^{0,0,R}=4$, $B_2^{0,0,G}=0$, $B_2^{0,0,B}=0$, ..., $B_2^{319,239,B}=176$, $p_2^{0,0,R}=255$, $p_2^{0,0,R}=255$, $p_2^{0,0,B}=255$, ..., $p_2^{319,239,B}=255$.

Calculate difference frame D with the formula (5) and obtain $D_2^{0,0,R}=2$, $D_2^{0,0,G}=0$, $D_2^{0,0,B}=6$, ..., $D_2^{319,239,B}=2$, Perform its binarization using threshold frame: $\gamma_2^{0,0,R}=0$, $\gamma_2^{0,0,G}=0$, $\gamma_2^{0,0,B}=0$, ..., $\gamma_2^{319,239,B}=0$.

Merge color channels based on OR-rule and obtain: $m_2^{0,0}=0$, $m_2^{1,0}=0$, $m_2^{2,0}=0$, ..., $m_2^{319,239}=0$, Label connected areas (with pixel value of 255) and receive the number of areas=0.

Further processing is not executed for the second frame.

For frames from the third to 9750, execute similar actions.

Take the 9751st frame with values $I_{9751}^{0,0,R}=2$, $I_{9751}^{0,0,G}=0$, $I_{9751}^{0,0,B}=5$, $I_{9751}^{1,0,R}=0$, $I_{9751}^{1,0,G}=0$, $I_{9751}^{1,0,B}=1$, $I_{9751}^{2,0,R}=4$, $I_{9751}^{2,0,G}=3$, $I_{9751}^{2,0,B}=5$, ..., $I_{9751}^{319,239,B}=177$.

Perform updating of the background and threshold frames based on the formulas (3), (4) and (6).

Obtain $B_{9751}^{0,0,R}=2$, $B_{9751}^{0,0,G}=0$, $B_{9751}^{0,0,B}=2$, $B_{9751}^{1,0,R}=2$, $B_{9751}^{1,0,G}=0$, $B_{9751}^{1,0,B}=2$, $B_{9751}^{2,0,R}=8$, $B_{9751}^{2,0,G}=5$, $B_{9751}^{2,0,B}=9$, ..., $B_{9751}^{319,239,B}=176$, $p_{9751}^{0,0,R}=6$, $p_{9751}^{0,0,G}=6$, $p_{9751}^{0,0,B}=6$, $p_{9751}^{1,0,R}=7$, $p_{9751}^{1,0,G}=6$, $p_{9751}^{1,0,B}=6$, $p_{9751}^{2,0,R}=5$, $p_{9751}^{2,0,G}=9$, $p_{9751}^{2,0,B}=11$, ..., $p_{9751}^{319,239,B}=6$.

Calculate difference frame D based on the formula (5) and receive $D_{9751}^{0,0,R}=6$, $D_{9751}^{0,0,G}=0$, $D_{9751}^{0,0,B}=3$, $D_{9751}^{1,0,R}=2$, $D_{9751}^{1,0,G}=0$, $D_{9751}^{1,0,B}=1$, $D_{9751}^{2,0,R}=6$, $D_{9751}^{2,0,G}=2$, $D_{9751}^{2,0,B}=4$, ..., $D_{9751}^{319,239,B}=1$.

Perform its binarization using threshold frame: $\gamma_{9751}^{0,0,R}=0$, $\gamma_{9751}^{0,0,G}=0$, $\gamma_{9751}^{0,0,B}=0$, $\gamma_{9751}^{1,0,R}=0$, $\gamma_{9751}^{1,0,G}=0$, $\gamma_{9751}^{1,0,B}=0$, $\gamma_{9751}^{2,0,R}=0$, $\gamma_{9751}^{2,0,G}=0$, $\gamma_{9751}^{2,0,B}=0$, ..., $\gamma_{9751}^{319,239,B}=0$.

Merge color channels based on OR-rule and receive: $m_{9751}^{0,0}=0$, $m_{9751}^{1,0}=0$, $m_{9751}^{2,0}=255$, $m_{9751}^{3,0}=0$, $m_{9751}^{4,0}=0$, $m_{9751}^{5,0}=0$, $m_{9751}^{6,0}=255$, $m_{9751}^{7,0}=0$, $m_{9751}^{8,0}=0$, ..., $m_{9751}^{319,239}=0$.

Label connected areas and receiving the number of areas=928.

Create pre-detection zones by generating circumscribing rectangles: $Dz_0=\{62, 14, 62, 15\}$, ..., $Dz_{927}=\{200,238,203,239\}$, where the coordinates can be found in the following order: (left border horizontally, the upper limit of vertically, horizontally right border, the lower limit of vertical).

Calculate the size of each zone in meters and receive: width of $Dz_0=1.38$ m, height of $Dz_0=2.66$ m, . . . , width of $Dz_{927}=0.11$ m, height of $Dz_{927}=0.10$ m.

Filter out the pre-detection zone due to the metric size and obtain 119 zones.

Pre-detection zones in binary frame are divided into sections. Receive coordinates of 149 sections: $Sz_0=(11, 14, 11, 14)$, . . . , $Sz_{927}=(200,238,203,239)$.

Form new tracking zones from the sections. The first position of a section is chosen from the closest one to the bottom central point of frame, that is, section with coordinates (118, 128, 121, 163), and creating a tracking zone satisfying predefined metric height of 0.8 m and width of 0.2 m. Obtain a tracking zone of coordinates (117, 150, 121, 163). A relevant section is excluded from further processing.

Then, for each of the remaining sections calculate the area of overlapping with the tracking zone. For the section with coordinates (113, 126, 117, 165), obtain the square of overlapping 14. The square of the section is 169. Because of the ratio of this area to the area of the section does not exceed the specified threshold of 10%, the section is not added to the tracking zones. This procedure is repeated for the remaining sections.

The procedure for forming a tracking zone is repeated as long as there are remaining non-applied (non-included) sections.

Calculate the ratio of the summary area of the sections attached to each zone of tracking, to the summary area of the overlap of sections with the tracking zone. For the tracking zone with the coordinates $\{1, 18, 1, 18\}$ value 0, 97 will be obtained. Since this value is more than the specified threshold, the tracking zone is considered reliable.

It turns out that in the current frame, there is a tracking zone with the coordinates $\{1, 18, 1, 18\}$.

Unite the tracking zones into one cluster, if the distance between their boundaries is less than 5 pixels. In this case, form one cluster $Cl_0\{1, 18, 1, 18\}$.

Calculate metric size of the cluster, using the camera calibration. Get the width of cluster 0, 83 m, a height—0.81 m.

Perform rejection based on the width Of $W_{CMin}$, $W_{CMax}$, and the height Of $H_{CMin}$, $H_{Cmax}$ of the clusters.

With Clusters passed in the rejection, continues further processing.

Since any zone of ignoring is not defined, screening on of the position of them does not process.

Calculate the lifetime of a cluster as the number of frames of detecting for each current cluster. To do this, compare the remaining clusters with the clusters stored in the previous frames. The lifetime of the cluster is defined as 1 because no cluster has been previously detected.

Since that value does not exceed a defined threshold 40, processing is finished for the current frame, but the cluster is stored to be processed at the further frames.

Perform similar calculations for each of the next frame up to the 9819th frame.

Take the 9820th frame with values $I_{9820}^{0,0,R}=3$, $I_{9820}^{0,0,G}=2$, $I_{9820}^{0,0,B}=0$, $I_{9820}^{1,0,R}=2$, $I_{9820}^{1,0,G}=1$, $I_{9820}^{1,0,B}=0$, $I_{9820}^{2,0,R}=9$, $I_{9820}^{2,0,G}=8$, $I_{9820}^{2,0,B}=13$, . . . , $I_{9820}^{319,239,B}=176$.

Perform updating of the background and threshold frames based on the formulas (3), (4) and (6).

Receive $B_{9820}^{0,0,R}=2$, $B_{9820}^{0,0,G}=0$, $B_{9820}^{0,0,B}=2$, $B_{9820}^{1,0,R}=2$, $B_{9820}^{1,0,G}=0$, $B_{9820}^{1,0,B}=2$, $B_{9820}^{2,0,R}=8$, $B_{9820}^{2,0,G}=5$, $B_{9820}^{2,0,B}=9$, . . . , $B_{9820}^{319,239,B}=176$, $p_{9820}^{0,0,R}=6$, $p_{9820}^{0,0,G}=6$, $p_{9820}^{0,0,B}=6$, $p_{9820}^{1,0,R}=7$, $p_{9820}^{1,0,G}=6$, $p_{9820}^{1,0,B}=6$, $p_{9820}^{2,0,R}=12$, $p_{9820}^{2,0,G}=8$, $p_{9820}^{2,0,B}=11$, . . . , $p_{9820}^{319,239,B}=6$.

Calculate the difference frame D with formula (5) and receive $D_{9820}^{0,0,R}=1$, $D_{9820}^{0,0,G}=2$, $D_{9820}^{0,0,B}=2$, $D_{9820}^{1,0,R}=0$, $D_{9820}^{1,0,G}=1$, $D_{9820}^{1,0,B}=2$, $D_{9820}^{2,0,R}=1$, $D_{9820}^{2,0,G}=2$, $D_{9820}^{2,0,B}=3$, . . . , $D_{9820}^{319,239,B}=0$.

Perform its binarization using threshold frame: $\gamma_{9820}^{0,0,R}=0$, $\gamma_{9820}^{0,0,G}=0$, $\gamma_{9820}^{0,0,B}=0$, $\gamma_{9820}^{1,0,R}=0$, $\gamma_{9820}^{1,0,G}=0$, $\gamma_{9820}^{1,0,B}=0$, $\gamma_{9820}^{2,0,R}=0$, $\gamma_{9820}^{2,0,G}=0$, $\gamma_{9820}^{2,0,B}=0$, . . . , $\gamma_{9820}^{319,239,B}=0$.

Merge color channels based on an OR-rule and receive: $m_{9820}^{0,0}=0$, $m_{9820}^{1,0}=0$, $m_{9820}^{2,0}=0$, $m_{9820}^{3,0}=0$, $m_{9820}^{4,0}=0$, $m_{9820}^{5,0}=0$, $m_{9820}^{6,0}=0$, $m_{9820}^{7,0}=0$, $m_{9820}^{8,0}=0$, . . . , $m_{9820}^{319,239}=0$.

Label non-zero connected areas and receive the number of areas=837.

Create pre-detection zones by generating circumscribing rectangles:

$Dz_0=\{115, 19, 116, 22\}$, . . . , $Dz_{836}=\{4, 163, 12, 167\}$, where the coordinates can be found in the following order: (x-left border, y-upper border, x-right border, y-bottom border).

Calculate the size of each zone in meters and receive: width of $Dz_0=1.38$ m, height of $Dz_0=2.66$ m, . . . , width of $Dz_{836}=0.36$ m, height of $Dz_{836}=0.29$ m.

Reject the pre-detection zone due to the size and receive 78 zones.

Pre-detection zones in a binary frame are divided into sections. Receive coordinates of 109 sections: $Sz_0=(115, 21, 115, 21)$, . . . , $Sz_{108}=(4, 163, 12, 167)$.

Form new tracking zones from the sections. For the first section, on a position closest to the bottom central point of the frame, that is, a section with coordinates $\{100, 135, 104, 165\}$, a tracking zone satisfying predefined metric height of 0.8 m and width of 0.2 m is created. Get tracking zone with coordinates $\{100, 152, 104, 165\}$. Appropriate sections are excluded from further processing.

Then, for each of the remaining sections, calculate the area of overlapping with the tracking zone. For the section of coordinates $\{100, 135, 104, 165\}$ receive overlapping area of 155. Square of the section is 155.

Since the ratio of this area to the area of section exceeds the assigned threshold of 10%, the section is attached to this tracking zone.

Other sections are not attached to this tracking zone, since there is no intersection.

This procedure is repeated as long as there are remaining non-processed sections.

They calculate the ratio of the summary area of the sections, attached to each zone of tracking, to the summary area of the overlap of sections with the zone of tracking. For the tracking zone with the coordinates $\{100, 152, 104, 165\}$ obtain the value of 1. Since this value is more than the specified threshold, the tracking zone is considered reliable.

As a result, obtain 37 tracking zones with coordinates: $\{108, 149, 112, 162\}$, $\{139, 69, 140, 76\}$, . . . , $\{2, 26, 2, 27\}$.

Make a comparison of tracking zones with the background frame by calculating normalized correlation and obtain the zone with the coordinates $\{116, 21, 116, 22\}$, that similarity does not exceed the threshold of 60%, so retain the zone for tracking, but rejects all other zones as their similarity exceeds 60% with the background.

After creating of the new tracking zones, get one zone with the coordinates $\{116, 21, 116, 22\}$.

Perform searching tracking zones formed on the previous frames in the current frame. Zones, having a value of similarity function during any displacement that exceeds the specified threshold, 70% (i.e. is found correspondence), are added to the list of the new tracking zones. Zones, in which correspondence is not found, are rejected.

Reveal correspondence for 24 of tracking zones and add them to the list of the new tracking zones.

Thus, obtain 25 of the tracking zones with the coordinates: $Tr_0=\{35, 132, 39, 145\}$, $Tr_1=\{35, 125, 39, 138\}$, . . . , $Tr_{24}=\{116, 21, 116, 22\}$.

Merge tracking zones wherein the distance between the boundaries of which less than 5 pixels into one cluster. In this case, form the four clusters: $Cl_0=\{30, 125, 39, 159\}$, $Cl_1=\{96, 125, 109, 166\}$, $Cl_2=\{63, 116, 63, 157\}$, $Cl_3=\{116, 21, 116, 22\}$.

Calculate metric size of clusters using calibrated cameras. Obtain: for $Cl_0$ cluster width of 0.21 m, height of 0.79 m, for $Cl_1$ cluster width of 0.20 m, height of 0.78 m, for $Cl_2$ cluster width of 0.38 m, height of 1.89 m, for $Cl_3$ cluster width of 0.54 m, height of 1.06 m.

Perform rejection by width $w_{min}$, $w_{max}$, height $h_{min}$, $h_{max}$ of clusters. Cluster passes rejection, so continue to further processing. Since the ignoring zones are not assigned, the rejection on the position of them is not performed.

The lifetime of a cluster is defined as the number of frames, during which the cluster is detected. To calculate the lifetime, we make the comparison of the remaining clusters with the clusters saved in previous frames.

For the cluster $Cl_0$, the device finds that a cluster which is close to the coordinates was not detected before. Therefore, the device set life-time=1 to the cluster. Process is finished at the current frame, but we preserve the cluster for the following frames.

For the cluster $Cl_1$ the device finds that a cluster was already found with the coordinates {95,126,108,166} and makes a decision that this is the same cluster. The device copies the life-time of cluster increasing by one from it and obtains 26. Since this value does not exceed a specified threshold of 40, the device finishes processing in this frame, but preserves the cluster for the following frames.

For the cluster $Cl_2$ the device finds that a cluster was already found with the coordinates {53, 116, 63, 157} and makes a decision that this is the same cluster. The device copies the life-time of cluster increasing by one from it and obtains 41. Since this value exceeds the threshold of 40, adopt the coordinates of the cluster as the coordinates of object located in the frame.

For the cluster $Cl_3$ the device finds cluster which is close on the coordinates and not discovered before. Therefore, the device set life-time=1 to the cluster. Processing in this frame is finished, but the cluster is preserved for the following frames.

Thus, make a decision about the detection on the current frame of object with the screen coordinates {63, 116, 63, 157}, with metric size of 0.38 on 1.89 m.

The device makes a similar calculation for each next frame.

One technical result of the embodiment is the reduction in the number of false responses, regardless of interference with the dynamic noises of varying intensity.

While the present invention has been described with reference to the particular illustrative embodiments, it is not to be restricted by those embodiments, but only by the appended claims. It is to be appreciated that those skilled in the art can change or modify the embodiments without departing from the scope and spirit of the present invention.

The invention claimed is:

1. A method of detecting objects in images obtained from a video camera, wherein the video camera is detachably connected to a computer having a memory, the method comprising:
   receiving, by the computer, frames of video from the video camera,
   wherein the computer is programmed to perform steps of:
   initializing a background with zero values or a first frame received by the computer;
   determining a constant of updating $\rho$ for updating the background for each pixel of the frames of video, depending on detection of an object according to a rule,
      wherein for a pixel classified as the background, $\rho=\rho_1$,
      wherein for a pixel classified as the object, $\rho=k*\rho_1$,
      where $0<\rho_1<1$, k is a first factor, $0<=k<1$;
   updating the background using the $\rho$,
   wherein the smaller the $\rho$ that is chosen, the longer time an object takes to be incorporated into the background;
   calculating a difference frame for each pixel, the difference frame indicating an absolute difference between a current frame and the background;
   calculating the threshold frame by a formula $p_i=k_1^2\sigma_i^2$, where $k_1$ is a second factor, and a variance $\sigma_i$ is updated by a formula $\sigma_i^2=(1-\rho)\sigma_{i-1}^2+\rho(\mu_i-I_i)^2$, where $I_i$ is a current frame, $\mu_i$ is a current background frame, and i is a number of frame;
   performing binarization of an image of the video to obtain a binary frame after the step of calculating the threshold frame, by comparing the threshold frame and the calculated difference frame,
   wherein a result of the comparison is either a zero value in the binary frame or a non-zero value in the binary frame;
   performing spatial-filtering by creating pre-detection zones including respective areas of connected pixels having the non-zero value in the binary frame,
   wherein the computer is further programmed to perform steps of:
   filtering the pre-detection zones;
   dividing into sections of equal width the pre-detection zones remaining after filtering; and
   forming tracking zones from the sections having a ratio of overlapping to a zone of predetermined width and height that exceeds a specified threshold.

2. The method according to claim 1, wherein the computer is further programmed to perform steps of:
   accepting the coordinates of clusters which are not rejected as the coordinates of objects, located in the frame
   filtering the tracking zones;
   combining the tracking zones remaining after filtering, and which are closely located to each other, into clusters;
   calculating cluster coordinates and metric sizes, and producing a defined zone for rejection of each cluster;
   rejecting clusters which are in a defined zone for rejection or which do not satisfy a predefined metric range of height and width;
   calculating a cluster life-time, which is the number of frames during which the cluster reveals itself, and rejecting clusters having a life-time that is less than a predetermined threshold; and
   accepting the coordinates of clusters which are not rejected as the coordinates of objects, located in the frame.

3. The method according to claim 2, wherein the video camera is a calibrated camera having predetermined parameters including a focal length, a sight angle, an angle around an axis, an installing height of the camera, a sensor size, and as sensor permission, wherein the step of performing spatial-filtering further comprises a step of creating the pre-detection zones as circumscribing rectangles, wherein the step of dividing further comprises a step of dividing the pre-detection zones into an integral number of sections of the width, which could be deployed inside the pre-detection zones corresponding to an alleged width of the detected objects, and wherein the step of forming tracking zones further comprises a step of creating a tracking zone while assigning the sections exceeding a specified threshold of an overlapping ratio to a width and height of an initial zone corresponding to the alleged width and height of the detected objects.

4. The method according to claim 3, wherein the step of forming the tracking zones further comprises:

excluding from further processing the tracking zones from the sections having a ratio of overlapping to a zone of predetermined width and height that exceeds the specified threshold; and rejecting the tracking zones from the sections having a ratio of overlapping to a zone of predetermined width and height that does not exceed the specified threshold.

5. The method according to claim 4, wherein the step of forming the tracking zones further comprises:

performing a comparison of tracking zones with the background frame by calculating a correlation function;

sorting out the tracking zones for which the value of the correlation function exceeds a specified threshold correlation;

searching the tracking zones formed at previous frames in a current frame, wherein the tracking zones for which the value of the correlation function exceeds the specified threshold hold correlation are added to a list of new tracking zones, and wherein the tracking zones for which there is no correspondence more than specified value in successive frames are rejected.

6. The method according to claim 1, wherein the video camera is a calibrated camera having predetermined parameters including a focal length, a sight angle, an angle around an axis, an installing height of the camera, a sensor size, and as sensor permission, wherein the step of performing spatial-filtering further comprises a step of creating the pre-detection zones as circumscribing rectangles, wherein the step of dividing further comprises a step of dividing the pre-detection zones into an integral number of sections of the width, which could be deployed inside the pre-detection zones corresponding to an alleged width of the detected objects, and wherein the step of forming tracking zones further comprises a step of creating a tracking zone while assigning the sections exceeding a specified threshold of an overlapping ratio to a width and height of an initial zone corresponding to the alleged width and height of the detected objects.

7. The method according to claim 6, wherein the step of forming the tracking zones further comprises:

excluding from further processing the tracking zones from the sections having a ratio of overlapping to a zone of predetermined width and height that exceeds the specified threshold; and rejecting the tracking zones from the sections having a ratio of overlapping to a zone of predetermined width and height that does not exceed the specified threshold.

8. The method according to claim 7, wherein the step of forming the tracking zones further comprises:

performing a comparison of tracking zones with the background frame by calculating a correlation function;

sorting out the tracking zones for which the value of the correlation function exceeds a specified threshold correlation;

searching the tracking zones formed at previous frames in a current frame, wherein the tracking zones for which the value of the correlation function exceeds the specified threshold hold correlation are added to a list of new tracking zones, and wherein the tracking zones for which there is no correspondence more than specified value in successive frames are rejected.

9. An apparatus for detecting objects in images, the apparatus comprising:

a video camera for providing the images; and a computer having a memory, wherein the computer is detachably connected to the video camera and receives frames of video from the video camera, wherein the computer is programmed to:

initialize a background with zero values or a first frame received by the computer;

determine a constant of updating $\rho$ for updating the background for each pixel of the frames of video, depending on detection of an object according to a rule, wherein for a pixel classified as the background, $\rho=\rho_1$, wherein for a pixel classified as the object, $\rho=k*\rho_1$, where $0<\rho_1<1$, k is a first factor, $0<=k<$;

update the background using the $\rho$, wherein the smaller the $\rho$ that is chosen, the longer time an object takes to be incorporated into the background;

calculate a difference frame for each pixel, the difference frame indicating an absolute difference between a current frame and the background;

calculate the threshold frame by a formula $p_i=k_1^2\sigma_i^2$, where $k_1$ is a second factor, and a variance $\sigma_i$ is updated by a formula $\sigma_i^2=(1-\rho)\sigma_{i-1}^2+\rho(\mu_i-I_i)^2$, where $I_i$ is a current frame, $\mu_i$ is a current background frame, and i is a number of frame;

perform binarization of an image of the video to obtain a binary frame after the step of calculating the threshold frame, by comparing the threshold frame and the calculated difference frame, wherein a result of the comparison is either a zero value in the binary frame or a non-zero value in the binary frame;

perform spatial-filtering by creating pre-detection zones including respective areas of connected pixels having the non-zero value in the binary frame, wherein the computer is further programmed to:

filter the pre-detection zones;

divide into sections of equal width the pre-detection zones remaining after filtering; and form tracking zones from the sections having a ratio of overlapping to a zone of predetermined width and height that exceeds a specified threshold, wherein the video camera is a calibrated camera having predetermined parameters including a focal length, a sight angle, an angle around an axis, an installing height of the camera, a sensor size, and as sensor permission, wherein the step to perform spatial-filtering further comprises a step to create the pre-detection zones as circumscribing rectangles, wherein the step to divide further comprises a step to divide the pre-detection zones into an integral number of sections of the width, which could be deployed inside the pre-detection zones corresponding to an alleged width of the detected objects, and wherein the step to form tracking zones further comprises a step to create a tracking zone while assigning the sections exceeding a specified threshold of an overlapping ratio to a width and height of an initial zone corresponding to the alleged width and height of the detected objects.

10. A non-transitory computer-readable storage medium having a computer program tangibly embodied thereon, the computer program causing a computer to detect objects in images obtained from a video camera, wherein the video camera is detachably connected to the computer, the computer program causing the computer to perform steps of:

receiving, by the computer, frames of video from the video camera, wherein the computer is programmed to perform steps of:

initializing a background with zero values or a first frame received by the computer;

determining a constant of updating $\rho$ for updating the background for each pixel of the frames of video, depending on detection of an object according to a rule, wherein for a pixel classified as the background, $\rho=\rho_1$, wherein for a pixel classified as the object, $\rho=k*\rho_1$, where $0<\rho_1<1$, k is a first factor, $0<=k<1$;

updating the background using the $\rho$, wherein the smaller the $\rho$ that is chosen, the longer time an object takes to be incorporated into the background, calculating a difference frame for each pixel, the difference frame indicating an absolute difference between a current frame and the background;

calculating the threshold frame by a formula $p_i=k_1^2\sigma_i^2$, where $k_1$ is a second factor, and a variance $\sigma_i$ is updated by a formula $\sigma_i^2=(1-\rho)\sigma_{i-1}^2+\rho(\mu_i-I_i)^2$, where $I_i$ is a current frame, $\mu_i$ is a current background frame, and i is a number of frame;

performing binarization of an image of the video to obtain a binary frame after the step of calculating the threshold frame, by comparing the threshold frame and the calculated difference frame, wherein a result of the comparison is either a zero value in the binary frame or a non-zero value in the binary frame;

performing spatial-filtering by creating pre-detection zones including respective areas of connected pixels having the non-zero value in the binary frame, wherein the computer program causes the computer to further perform steps of:

filtering the pre-detection zones;

dividing into sections of equal width the pre-detection zones remaining after filtering; and forming tracking zones from the sections having a ratio of overlapping to a zone of predetermined width and height that exceeds a specified threshold, wherein the video camera is a calibrated camera having predetermined parameters including a focal length, a sight angle, an angle around an axis, an installing height of the camera, a sensor size, and as sensor permission, wherein the step of performing spatial-filtering further comprises a step of creating the pre-detection zones as circumscribing rectangles, wherein the step of dividing further comprises a step of dividing the pre-detection zones into an integral number of sections of the width, which could be deployed inside the pre-detection zones corresponding to an alleged width of the detected objects, and wherein the step of forming tracking zones further comprises a step of creating a tracking zone while assigning the sections exceeding a specified threshold of an overlapping ratio to a width and height of an initial zone corresponding to the alleged width and height of the detected objects.

* * * * *